UNITED STATES PATENT OFFICE.

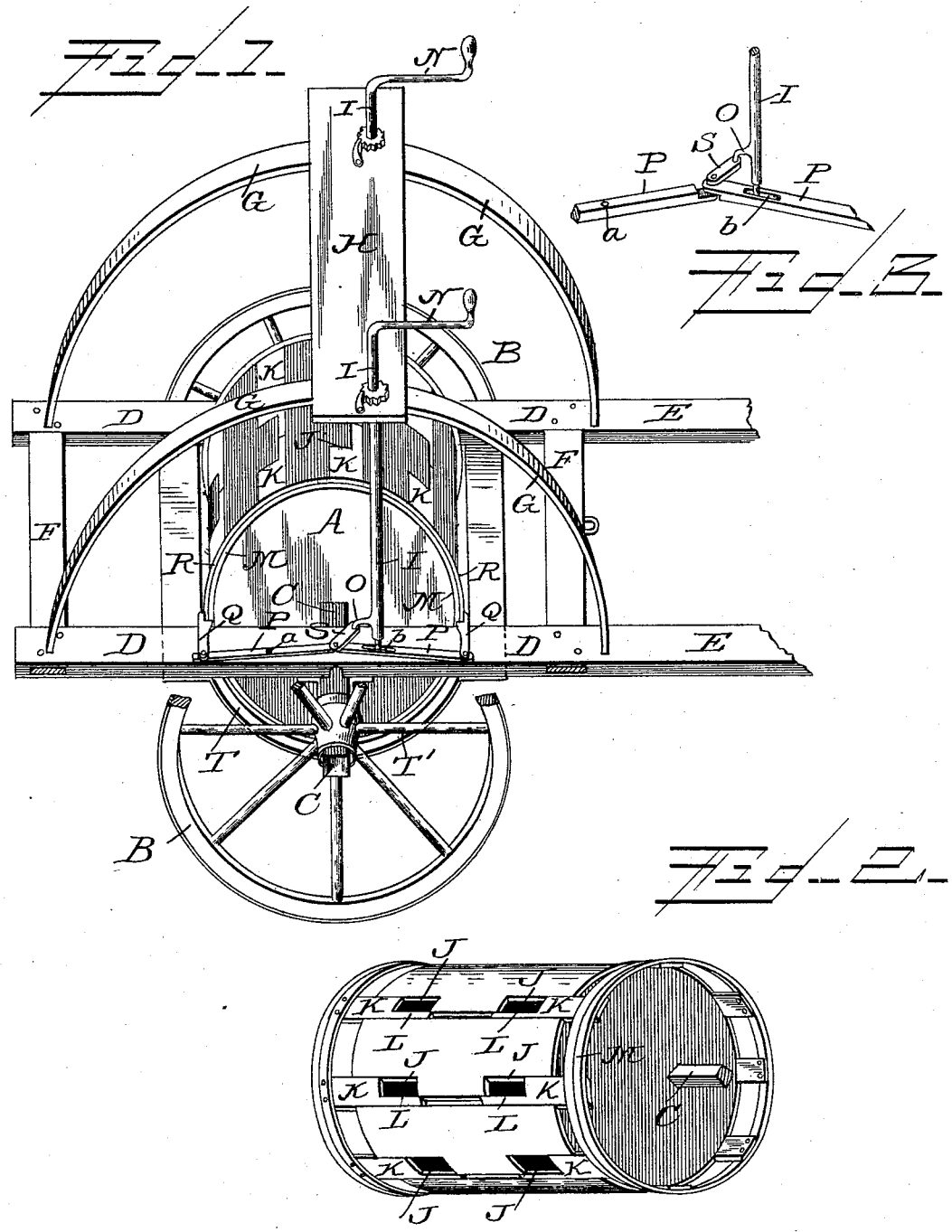

THOMAS HARDEN LAKE AND ROCKWELL WOODBURY DICKSON, OF MOBILE, ALABAMA; SAID DICKSON ASSIGNOR TO SAID LAKE.

FERTILIZER-DISTRIBUTER.

SPECIFICATION forming part of Letters Patent No. 489,313, dated January 3, 1893.

Application filed August 30, 1892. Serial No. 444,577. (No model.)

*To all whom it may concern:*

Be it known that we, THOMAS HARDEN LAKE and ROCKWELL WOODBURY DICKSON, citizens of the United States, residing at Mobile, in the county of Mobile and State of Alabama, have invented certain new and useful Improvements in Fertilizer-Distributers; and we do declare the following to be a full, clear, and exact description of the invention, such as will enable others skilled in the art to which it appertains to make and use the same, reference being had to the accompanying drawings, and to the letters of reference marked thereon, which form a part of this specification.

The herein described invention consists of a machine to be used on farms for the uniform distribution of fertilizers, having for its object a simple and effective construction of device which will take the place of the old methods of distributing fertilizers, usually that of distributing by hand, and supply a machine which for this part of the farm work would be within the means of every farmer owing to the simplicity of its construction and the small expense required to build the same, while the saving of time and labor, and the uniformity of its distribution are considerations of prime importance and readily apparent to one in the farming industry.

Briefly outlined the invention may be said to consist of a suitable vehicle, preferably two wheeled, having mounted on the axle of the same between the two wheels a suitable drum or cylinder, which being rigidly secured to the axle revolves with it as the wheels of the vehicle turn, the said drum or cylinder having openings therein which are closed by a series of slides secured to an end band or frame made to operate in and out by means of a system of levers operated by a crank at the side of the driver, it being the purpose to have the machine drawn by a horse.

The invention also consists in certain novel features in the construction and arrangement of parts, all, as hereinafter described and pointed out in the claims.

In the accompanying drawings in which the invention is fully illustrated, Figure 1, is a perspective view of the complete device, the openings in the distributing cylinder being shown as closed. Fig. 2, is a perspective view of the distributing cylinder detached with the end bands and slides withdrawn to open the cylinder. Fig. 3, is a detail view of the system of levers for operating the band and its slides back and forth.

The frame forming the body of the vehicle can be made in any desired form or construction which will admit of the drum or cylinder A being mounted between the wheels B on the axle C and to revolve on said axle in the turning of the wheels as the device is pulled, the construction shown being that of two side frames D, which are extended or allowed to project forward to form the shafts E, the same being held together at and near the rear by the cross bars F, and F'.

Supports G, G, preferably in the form of an arch, as shown, are secured to the frames D, D, and being provided with the cross board H, provides the seat for the driver and also the support for the crank shafts I at either side, whereby the opening and closing of the distributing cylinder A, is controlled by the driver at will. As before stated the cylinder revolves with the axle, being rigidly mounted thereon and deposits through the openings J the fertilizer, which by the rotation of the cylinder A, keeps it in a loose or agitated condition and also facilitates its passage through the said openings. The cylinder is preferably provided with two series of openings, a series at each end and operated separately and distinct the one from the other. The openings J are of rectangular form and closed by slides K of corresponding size and form, with the exception of an inner extension L, formed preferably to one side thereof and fitting within a correspondingly formed groove on the periphery of the cylinder, the said extension and groove forming a guide to facilitate the sliding back and forth of the slides in the openings J, in opening and closing the cylinder. The slides K, at their respective ends of the cylinder are firmly attached to the band or hoop M, preferably formed of metal, which connects them together and operates them all at the same time, the hoop M being operated directly upon by a system of levers actuated by the crank shaft from the driver's seat. The crank shaft I is provided at its top with the crank arm N, and at its lower end where it finds its bearing in the frame D, with an arm or lever O, by which the shifting band with its slides is operated by connection with the toggle lever and link arms now to be referred to particularly.

On the frame D is secured the jointed or toggle lever P, which extends slightly beyond the ends of the cylinder heads and is secured to the frame D at points $a$ and $b$, a slot being formed at point $b$ to allow the shaft I to form its pivot by extending therethrough and to allow the longitudinal play required. To the ends of the jointed lever or toggle are pivotally secured arms or reaches Q, which connect with a ring R, loosely encircling the slides, and held in place by engagement with the inner face of the hoop or band M, said arms or reaches being also adapted to engage the outer face of the band M when forced in by the levers. The arm or link S connects with the toggle lever at its joint. It will thus be seen that on turning the crank the arm or lever O of the crank shaft will be swung partly around and by its connection with the toggle will cause its joint to move back and forth according as the crank shaft is moved and this movement will also make a corresponding movement at the ends which being connected with the band M, having the slides connected therewith, will shift the same back and forth to open and close the cylinder openings.

The axle on which the cylinder and wheel are mounted is square except at its bearings in the frame D, which permit the wheels to be adjusted thereon to accommodate the machine to the furrows of the field which are often of varied distances apart. The frame of the machine has also the rear and front aprons T and T' which extend down under the cylinder and direct the fertilizer onto the ground in a continuous stream. It will be understood that both sides of the cylinder are operated from separate crank shafts, as shown, but it is possible to operate both sides from one side and by means of one crank shaft and its system of levers, if so desired, by but slight change in the construction and such we deem to be fully within the scope and spirit of our invention.

Having thus described our invention, what we claim and desire to secure by Letters Patent, is:

In a fertilizer distributer, the cylinder or drum A adapted to revolve with the axle of the machine, having openings formed therein and a series of connected slides adapted to fit said openings and to slide in and out of same, in combination with the crank shaft I, arm or lever O, link S, toggle lever P, arms or reaches Q, connecting the end of the toggle lever with the connected slides by means of the loose ring R, substantially as described and for the purpose set forth.

In testimony whereof we affix our signatures in presence of two witnesses.

THOS. HARDEN LAKE.
ROCKWELL WOODBURY DICKSON.

Witnesses:
GEO. E. SAGE,
W. L. BAKER, Jr.